(No Model.)

F. J. PORTER.
DEVICE TO ASSIST IN THE INSERTION OF VEHICLE THILLS INTO COUPLINGS.

No. 409,300.          Patented Aug. 20, 1889.

Witnesses:
Wm O Stark
Centie S Stark

Inventor:
F. J. Porter,
by Michael J Stark,
Attorney.

UNITED STATES PATENT OFFICE.

FRANK J. PORTER, OF WILLINK, NEW YORK.

DEVICE TO ASSIST IN THE INSERTION OF VEHICLE-THILLS INTO COUPLINGS.

SPECIFICATION forming part of Letters Patent No. 409,300, dated August 20, 1889.

Application filed March 27, 1889. Serial No. 304,928. (No model.)

*To all whom it may concern:*

Be it known that I, FRANK J. PORTER, of Willink, in the county of Erie and State of New York, have invented a certain new and useful Device to Assist in the Insertion of Vehicle-Thills into Couplings; and I do hereby declare that the following description of my said invention, taken in connection with the accompanying sheet of drawings, forms a full, clear, and exact specification, which will enable others skilled in the art to which it appertains to make and use the same.

This invention has general reference to a device to assist in the insertion of the eyes of wagon and carriage thills into the couplings, having an anti-rattler rubber; and it consists, essentially, in the novel and peculiar combination of parts and details of construction, as hereinafter first fully set forth and described, and then pointed out in the claims.

Figure 1:
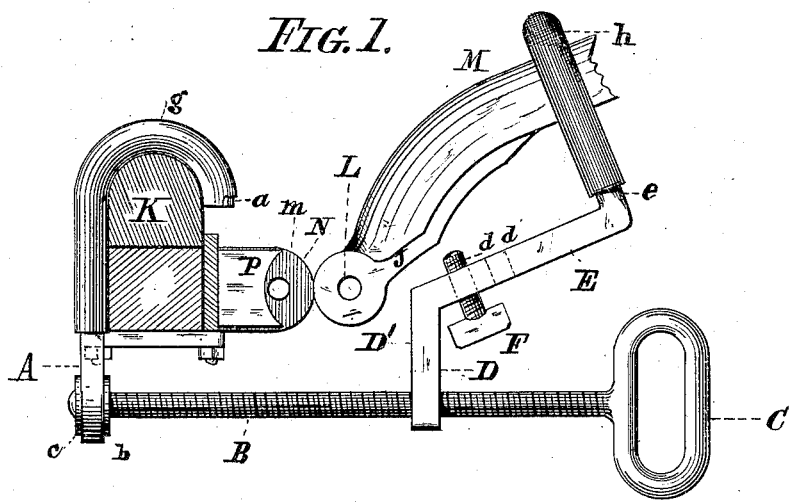
Figure 3:
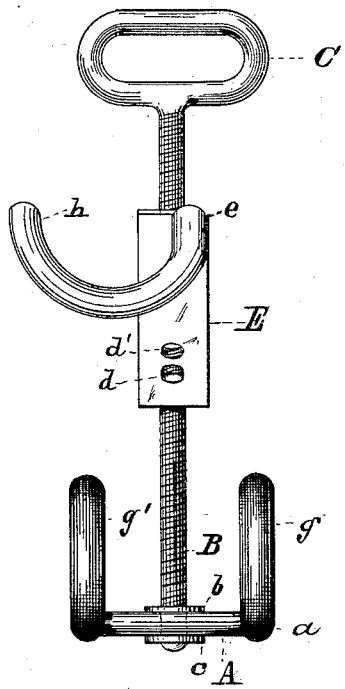
Figure 2:
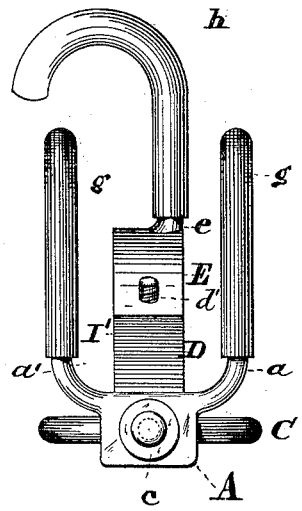

In the drawings already mentioned, Figure 1 is a side elevation of my device, showing the same as applied to the axle and thill of the vehicle when in operation. Fig. 2 is an end elevation of my device, and Fig. 3 is a plan view of the same.

Like parts are designated by corresponding letters of reference in all the figures.

The object of my present invention is the production of a cheap, simple, and efficient device to assist in the insertion of the eyes of vehicle-thills into the couplings, especially such as are provided with an anti-rattler or rubber cushion, it being a well-known fact that the insertion of the eyes of the thills into such couplings by hand is a very laborious undertaking. To accomplish this result, I construct my device of a body portion A, provided on its upper end with two hooks $a$ $a'$, covered with rubber tubing $g$ $g'$ or other suitable material, said body A having a hole in its lower extremity, in which the screw-threaded spindle B is suitably journaled.

The screw-threaded spindle B consists, essentially, of a rod B, having a screw-thread cut along its entire length, and provided at one extremity with a collar $b$ and a washer $c$, said washer $c$ being riveted or otherwise suitably fastened upon said spindle B, after it is inserted into the body A.

D is a clamping-piece consisting, essentially, of a downwardly-projecting piece D', provided near its lower extremity with a hole having an internal screw-thread to receive the screw-threaded spindle B; of an obliquely-arranged middle piece E, having screw-threaded holes $d$ $d'$ to receive the thumb-screw F, and of an upwardly-projecting hook $e$, said hook being covered with rubber tubing $h$ or other suitable material.

To apply the device herein described, the body-piece A, having the rubber or otherwise covered hooks $a$ $a'$, is placed over the axle K of the vehicle, while the clamping-piece D, with its rubber-covered hook $e$, is hooked over the lower extremity of the thill M, and the thumb-screw F revolved until the same bears against the under side of the thill-iron J, whereupon the screw-spindle B is revolved with one hand (while the other is pressed against the thill to prevent the same from falling out of position) until the hole in the eye L of the thill is opposite to the hole $m$ in the coupling N, whereupon the thill-bolt is passed through the holes in both the coupling and eye and the parts properly connected.

To remove the device, the screw-spindle is revolved in the opposite direction and lifted off from the axle and thill in an obvious manner.

Thill-couplings as now constructed are usually provided with an anti-rattler rubber packing P, which is placed behind the thill in the coupling. In changing the thill for a pole for two horses, and vice versa, a serious obstacle is found in the anti-rattler rubber packing, it being necessary to compress the same in order to bring the hole in the eye opposite the hole in the coupling, as shown in Fig. 1. It will be readily seen that to force the thill in by hand, as it is now done, occasions a great deal of annoyance and delay, and, in addition, requires two or three persons to do the work.

In my device the above-named objections are overcome, and in livery-stables, where the change from thills to poles, and vice versa, is frequently made, a great deal of trouble and valuable time is saved.

The device heretofore described can be produced either in malleable iron or steel in the process of casting or in wrought-iron forgings. When the former methods are employed, it can be manufactured at a very low figure, and will be found to be a very desirable article of manufacture.

Having thus fully described my invention, I claim as new and desire to have secured to me by Letters Patent of the United States—

1. A device for assisting in inserting the eyes of thills and poles into the couplings on the axle of vehicles, consisting of a body-piece having hooks to engage the said axle, a screw-spindle journaled in said body-piece, and a clamp actuated by said spindle and adapted to engage the thill, the whole being constructed and combined substantially as and for the object specified.

2. In a device to assist in the insertion of vehicle-thills into couplings, a body-piece A, having hooks $a\ a'$, in combination with a screw-threaded spindle having a handle C, collar $b$, and washer $c$, and a clamping-piece D′, having a hook $e$, substantially as described.

3. In a device to assist in the insertion of vehicle-thills into couplings, a body-piece A, provided with a hole near its lower extremity for the reception of the screw-spindle B, and hooks $a\ a'$, in combination with a screw-spindle B, having a handle C, collar $b$, and washer $c$, and a clamping device with a downwardly-projecting piece D′, obliquely-arranged middle piece E, and upwardly-projecting hook $e$, as and for the purpose stated.

4. In a device to assist in the insertion of vehicle-thills into couplings, a body-piece A, provided with a hole near its lower extremity for the reception of the screw-spindle B, and hooks $a\ a'$, covered with rubber tubing $g\ g'$, in combination with a screw-spindle B, having a handle C, collar $b$, and washer $c$, and a clamping-piece D, provided with a downwardly-projecting piece D′, obliquely-arranged middle piece E, having screw-threaded holes $d\ d'$ for the reception of thumb-screw F, and an upwardly-projecting hook $e$, being covered with rubber or other material $h$, as and for the purpose stated.

5. In a device to assist in the insertion of vehicle-thills into couplings, a body-piece A, provided with a hole near its lower extremity, and hooks $a\ a'$, covered with rubber tubing $g\ g'$, in combination with a screw-spindle B, having a handle C, collar $b$, and washer $c$, and a clamping-piece D′, provided with a screw-threaded hole near its lower extremity to fit and receive the screw-threaded spindle B, whereby said clamping-piece may be moved along said spindle B by revolving the latter, in a manner substantially as described.

In testimony that I claim the foregoing as my invention I have hereto set my hand in the presence of two subscribing witnesses.

FRANK J. PORTER.

Attest:
JENNETTE N. ADDINGTON,
EMMA J. PORTER.